(12) United States Patent
Wang et al.

(10) Patent No.: US 8,709,301 B2
(45) Date of Patent: *Apr. 29, 2014

(54) NI-, CO-, AND MN- MULTI-ELEMENT DOPED POSITIVE ELECTRODE MATERIAL FOR LITHIUM BATTERY AND ITS PREPARATION METHOD

(75) Inventors: Jiaxiang Wang, Chengdu (CN); Kaiping Wu, Chengdu (CN); Xiaobing You, Chengdu (CN); Pin Xu, Chengdu (CN); Yu Wang, Chengdu (CN); Yun Lu, Chengdu (CN); Rulan Liao, Chengdu (CN)

(73) Assignee: Chengdu Jingyuan New Materials Technology Co., Ltd., Chengdu (CN)

( * ) Notice: Subject to any disclaimer, the term of this patent is extended or adjusted under 35 U.S.C. 154(b) by 315 days.

This patent is subject to a terminal disclaimer.

(21) Appl. No.: 13/124,664

(22) PCT Filed: Sep. 29, 2009

(86) PCT No.: PCT/CN2009/074301
§ 371 (c)(1),
(2), (4) Date: May 22, 2011

(87) PCT Pub. No.: WO2010/043154
PCT Pub. Date: Apr. 22, 2010

(65) Prior Publication Data
US 2011/0226986 A1    Sep. 22, 2011

(30) Foreign Application Priority Data
Oct. 17, 2008  (CN) .......................... 2008 1 0046300

(51) Int. Cl.
*H01B 1/02* (2006.01)
*H01M 4/13* (2010.01)

(52) U.S. Cl.
USPC ................ 252/521.2; 252/519.1; 429/231.95; 429/223; 429/224

(58) Field of Classification Search
USPC ............ 252/182.1, 521.2, 519.1; 429/231.95, 429/223, 224
See application file for complete search history.

(56) References Cited

FOREIGN PATENT DOCUMENTS

| CN | 1514502 A | | 3/2006 |
|---|---|---|---|
| CN | 1787258 A | | 6/2006 |
| CN | 101510603 | * | 8/2009 |
| JP | 9-199127 A | | 7/1997 |
| JP | 2004-196579 A | | 7/2004 |
| JP | 2005-25975 A | | 1/2005 |

* cited by examiner

Primary Examiner — Monique Peets
(74) Attorney, Agent, or Firm — Novick, Kim & Lee, PLLC; Allen Xue

(57) ABSTRACT

A Ni—, Co—, and Mn— multi-element doped positive electrode material for lithium ion batteries and its preparation method are provided. The method for preparing said material consists of: first forming a Ni—, Co—, and Mn— multi-element doped intermediate compound by coprecipitation or chemical synthesis; mixing said multi-element intermediate compound with lithium salt and pre-processing the resulting mixture; adding polyvinyl alcohol into the mixture and mixing uniformly, then pressing the resulting mixture into blocks, and calcining these at 800~930° C.; cooling outside the furnace, crushing and passing through a 400-mesh sieve; calcining the resulting powder at 700~800° C., cooling outside the furnace and crushing to obtain the product. The positive electrode material obtained by the method described is in the form of non-agglomerated monocrystal particles, with a particle diameter of 0 5~30 μm, the chemical formula $LiNi_xCo_yMn_zM_{(1-x-y-z)}O_2$, a compacted density of up to 3.4 g/cm³, and an initial discharge capacity of 145~152 mAh/g. This positive electrode material shows excellent cycle performance and a high degree of safety.

8 Claims, 3 Drawing Sheets

Figure 1:
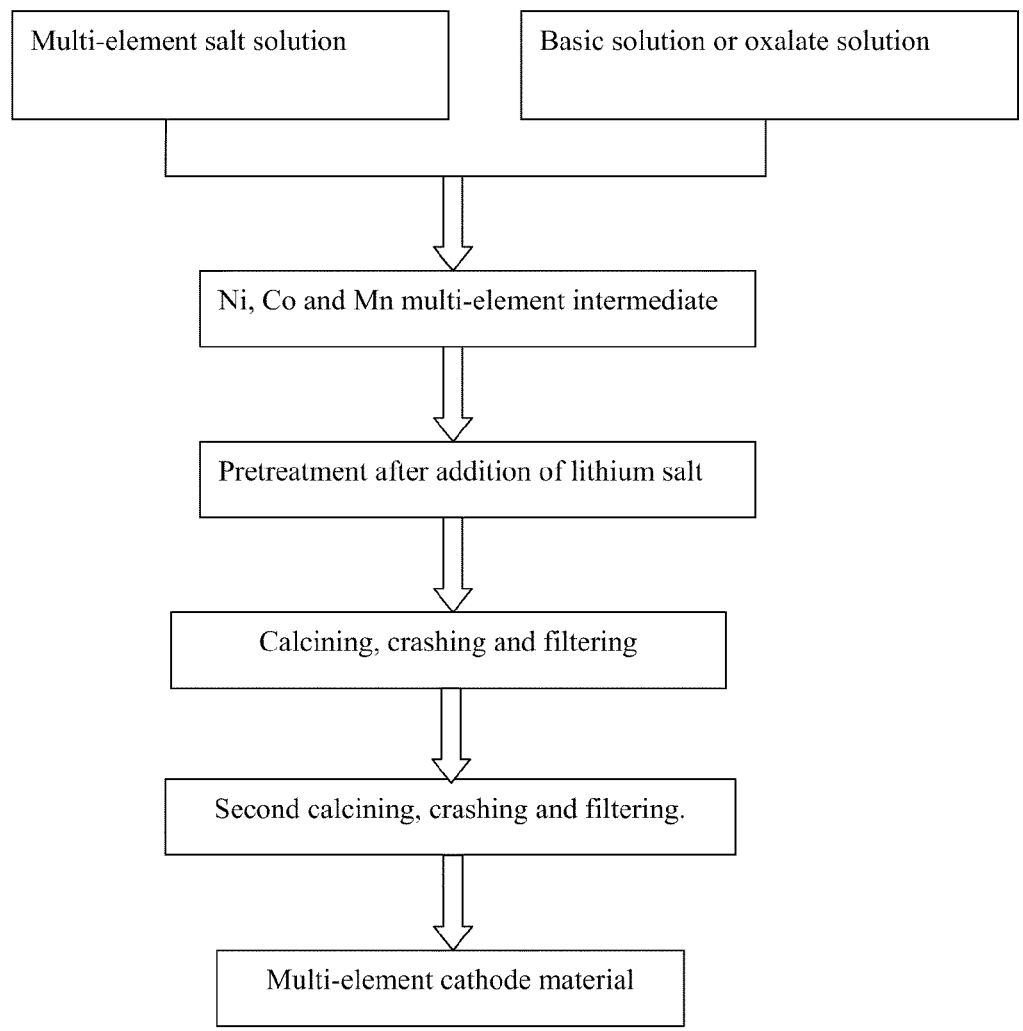

NI-, CO-, AND MN- MULTI-ELEMENT DOPED POSITIVE ELECTRODE MATERIAL FOR LITHIUM BATTERY AND ITS PREPARATION METHOD

CROSS-REFERENCES TO RELATED APPLICATIONS

The present application claims the benefit of the Chinese Patent Application No. 200810046300.8, filed Oct. 17, 2008, which is incorporated herein by reference in its entirety and for all purposes.

THE TECHNICAL FIELD

The present invention discloses a Ni—, Co—, and Mn— multi-element doped positive electrode material for lithium battery and its preparation method, which belongs to the technical field of energy source material.

BACKGROUND

Currently, the primary cathode material for lithium ion batteries used in cell phone and laptop computers is $LiCoO_2$. $LiCoO_2$ shows original discharge capacity of 140-145 mAh/g and has good cycling characteristics and has been used extensively for cathodes in lithium ion batteries. However, $LiCoO_2$ is expensive because of the shortage of Co. At the same time, $LiCoO_2$ has low capacity and is unsafe. In recent years, extensive research was conducted on preparation of lithium manganate ($LiMn_2O_4$), $LiNiO_2$ and other materials to formulate low-cost high-performance cathode materials. Application of $LiMn_2O_4$ is limited to small electrokinetic cells due to its low charge capacity and inferior cycling performance, especially under high temperatures. Application of $LiNiO_2$ is limited to experimental research because of difficulties in synthesis.

$LiNiO_2$, $LiCoO_2$, $LiMn_2O_4$ multi-element cathode material (MCM hereafter) is a new material for high-capacity lithium ion battery cathode. It has excellent safety properties, relatively low price, good compatibility with electrolyte and outstanding cycling performance. However, the application of this material is limited because it is difficult to synthesize, is relatively unstable and has lower density than $LiCoO_2$. In recent years, preparation of MCM improved significantly. Compound crystal particles of MCM, mostly spherical-like, were prepared and it was shown that each particle is an aggregate or combination of multiple particulates. The tap density of such material could reach 2.0~2.5 $g/cm^3$, and the initial discharge capacity could reach 140~145 mAh/g. At present, MCM produced in trial-production by cathode material producers are of the compound crystal particle type. This type of material requires complicated preparation technology, and although it has relatively high tap density and its compacted density could reach 3.2~3.4 $g/cm^3$, there is limited room for increasing its density. In addition, because it is difficult to achieve uniformity of the sizes among the compound crystal particles that are made of particulates, there is a wide distribution of granularity, resulting in particulates falling off the surface of compound crystals, which is detrimental to the stability of the products. Furthermore, spherical-like compound crystal particles show increased hygroscopicity that negatively affects the service performance of the products.

SUMMARY OF INVENTION

It is, accordingly, the object of the invention to overcome the foregoing problems in the prior art and provide a cathode material that shows increased compacted density, lower hygroscopicity and better structural stability, which is made of Ni, Co and Mn that is doped with multiple other elements. Another object of the present invention is to provide a method of preparing such materials.

For attaining the foregoing objects, in accordance with the present invention, a cathode material made of Ni, Co and Mn and doped with multiple other elements, which has the chemical formula of $LiNi_xCo_yMn_zM_{(1-x-y-z)}O_2$, is prepared, where M stands for Mo, Cr, Ge, In, Sr, Ta, Mg or one or more of the rare earth elements. In the formula above, the range of x, y and z are as following: $0.3<x<0.4$, $0.29<y<0.35$, $0.3<z<0.4$. The particles of this material is non-agglomerated monocrystals, with grain diameters in the range of 0.5-30 μm. The total amount of M is 0.13-0.3% of the total weight of Ni, Co and Mn.

The method for preparation of the cathode material consists of the following steps:

1. Preparation of Ni, Co and Mn multi-element intermediate: sulfate or nitrate of Ni, Co and Mn were dissolved in water and salt of Mo, Cr, Ge, In, Sr, Ta, Mg or the salt of one or more of the rare earth elements were added to the Ni, Co and Mn salt solution to make a multi-element metal salt solution with a molar concentration in the range of 0.8-1.3 mol/L calculated by counting all the metals. In this solution, the molar ratio of Ni, Co and Mn is Ni:Co:Mn=(0.9-1.2):1:(0.9-1.2), and the total amount of Mo, Cr, Ge, In, Sr, Ta, Mg or rare earth elements is 0.13-0.3% of the total weight of Ni, Co and Mn.
   In the temperature range of 40-70° C., the solution above was added into a basic solution of NaOH and $NH_3$ that contains Macrogol 6000 or a oxalate solution that contains Macrogol 6000 at a rate of 5-30 mL/min. The basic solution of NaOH and $NH_3$ has pH value greater than 8, and the concentrations of NaOH and $NH_3$ are 0.02-0.9 mol/L and 0.01-0.9 mol/L, respectively. The amount of this solution used is 1.04-1.07 times of what is calculated from the reaction formula. The oxalate solution above is a solution of ammonium oxalate or sodium oxalate with the concentration being 0.8-1.2 mol/L and the amount of this solution used is 1.05-1.1 times of what is calculated from the reaction formula. The amount of Macrogol 6000 used is about 0.4-1.5% of the total weight of Ni, Co and Mn.
   After addition of the salt solution, the stirring continued for 1-2 hours and sit for about 1-4 hours, filtered to obtain solid products. The solids were washed with de-ionized water, where the amount of water used is about 7-13 times that of the solids, to obtain solids with the weight percentage of Na being less than 0.01%. The washed solid was dried for 3-5 hours at 105-120° C. to obtain the Ni, Co and Mn multi-element intermediate.
2. The Ni, Co and Mn multi-element intermediate was mixed evenly with Lithium salt according to the molar ratio of Li:(Ni+Co+Mn)=1.05-1.1:1. The mixture was grounded for 2-8 hours, then pretreated at 500-520° C. for 2 hours. Afterwards, polyvinyl alcohol (PVA) was added to the pretreated material and mixed evenly, then the mixture was compacted to lumps. The amount of PVA used is 0.98-2% of the total weight of Ni, Co and Mn.
3. The lump obtained in the last step is placed in a oven and calcined at 800-930° C. for 16-22 hours, then cooled to 45-55° C., crashed and filtered through 400 mesh sieves.
4. The filtered material was then put in porcelain dish, which is then placed in oven and calcined at 700-800° C. for 5-8 hours. The material is then cooled to 45-55° C., crashed and filtered through 400 mesh sieves. The filtered material is the multi-element cathode material consisting of non-agglomerated monocrystal. Such material could be square-, rectangle-, lozenge- or irregular polygon-shaped.

Comparing to current technology, this method of preparation is easier to control. The Macrogol 6000 in the process brings excellent dispersion, and the PVA helps with compacting of the material. The material thus prepared consists of non-agglomerated monocrystal having particle diameters of 0.5~30 μm, and shows a increased compacted density that is no less than 3.4 g/cm$^3$, which could lead to the elimination of falling off of particulate during manufacturing of battery pole piece because of formation of tiny particulate. The cathode material presented in this invention also shows lowered hygroscopicity, its initial discharge capacity could reach 145~152 mAh/g, and it also shows better cycling performance and safety characteristics.

DESCRIPTIONS OF DRAWINGS

Figure 2:
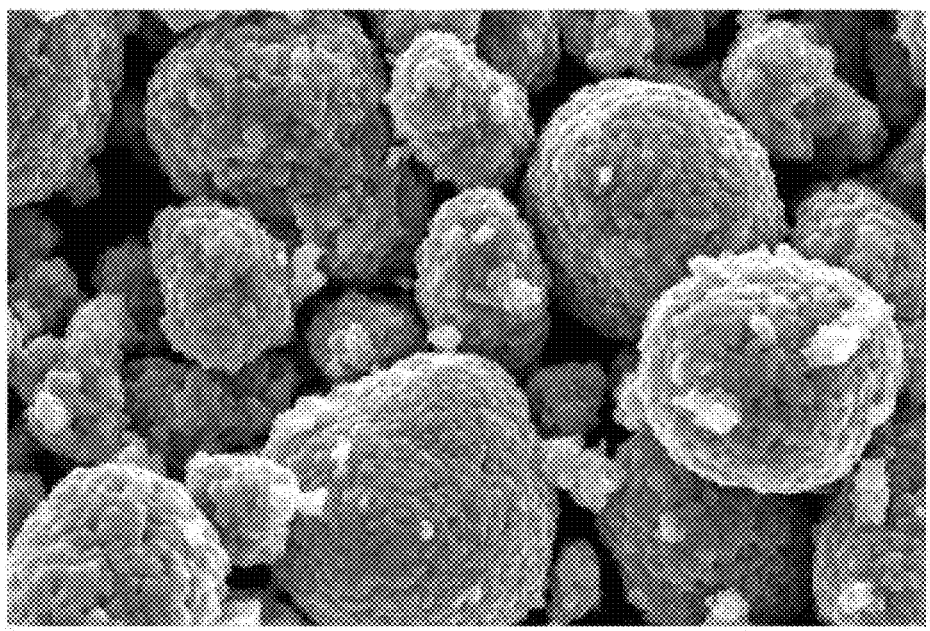
Figure 3:
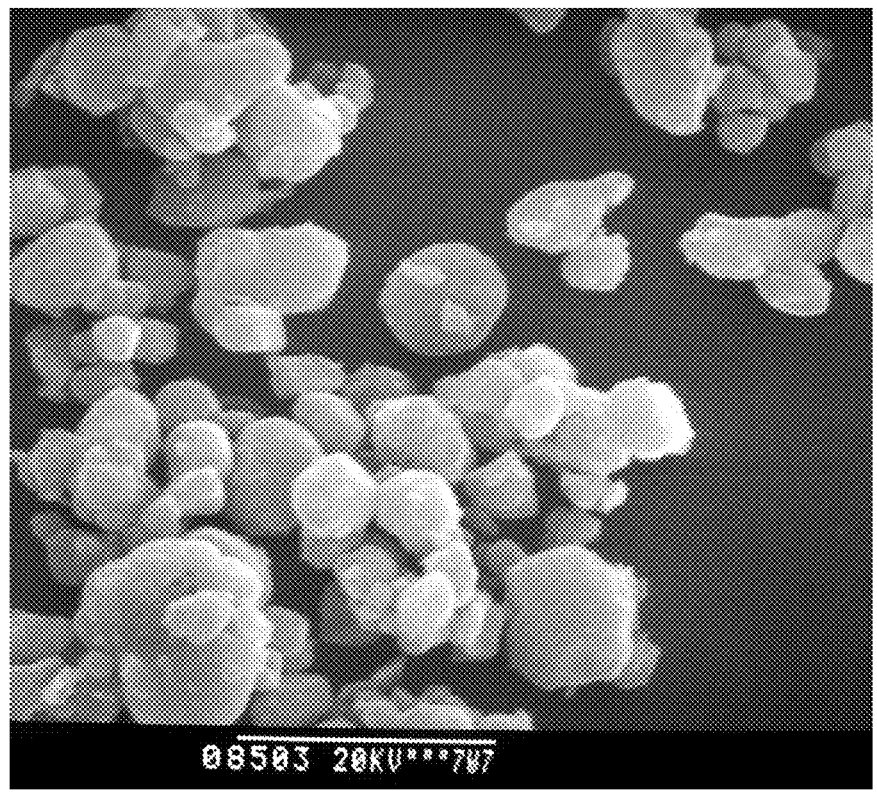

FIG. 1 is the flow chart of the preparation method.
FIG. 2 is an SEM image of a material comprised of Ni, Co and Mn.
FIG. 3 is an SEM image of the cathode material of this invention.

DETAILED DESCRIPTION OF THE EMBODIMENT

Example 1

182.4 grams of nickel sulfate NiSO$_4$ with the weight percentage of Ni being 21.2%, 210.0 grams of cobalt sulfate CoSO$_4$ with the weight percentage of Co being 20.56% and 112.4 grams of manganese sulfate MnSO$_4$ with the weight percentage of Mn being 32.2% were mixed in 2.2 L water and dissolved by stirring and then the solution was filtered. Europium nitrate Eu(NO$_3$)$_3$ that contains 0.03 gram of Eu, dysprosium nitrate Dy((NO$_3$)$_3$ that contains 0.06 gram of Dy and potassium tantalate KTaO$_3$ that contains 0.07 gram of Ta were added to the filtrate and dissolved by stirring to make 2.5 L of multi-element salt solution with a total metal molar concentration of 0.82 mol/L. In this solution, the molar ratio of Ni, Co and Mn is Ni:Co:Mn=0.9:1:0.9 and the total amount of Dy, Eu and Ta is 0.136% of the total weight of Ni, Co and Mn.

The multi-element salt solution prepared above was heated to about 70° C. and 1.2 L of it was added, at a rate of 5-10 mL/min, to 2 L basic solution, in which the concentrations of NH$_3$ and NaOH are 0.73 mol/L and 0.73 mol/L, respectively, that contains 1.7 grams of Macrogol 6000 and was heated to 45° C., in which the amount of Macrogol 6000 is 1.44% of the total weight of the elements Ni, Co and Mn. Then 58.4 grams of NaOH was added to the mixture while stirring, and the stirring continued for 1 hour after the addition of NaOH. The solution was then sit for 4 hours and filtered to obtain solid products. The solids were washed with 2 liters of de-ionized water until the weight content of sodium was lower than 0.01%. The solids were then heated in at about 115° C. for 5 hours to obtain 189.9 grams of the Ni, Co and Mn multi-element intermediate.

All of the intermediate was then mixed with 89.6 grams of LiOH.H$_2$O and the mixture was grounded for 2 hours. The mixture was then pretreated at 520° C. for 2 hours. Then the mixture was mixed with 2.3 grams of PVA evenly and compacted to lumps. The amount of PVA used is 1.95% of the total weight of Ni, Co and Mn.

The lump was placed in an oven and calcined at 820° C. for 16 hours, then at 930° C. for 6 hours. It is then cooled to about 50° C., crashed and filtered through a 400 mesh sieve. The filtered product was then placed in a porcelain dish and calcined at 800° C. for 5 hours, then cooled to 50° C., crashed and filtered through 400 mesh sieves to obtain 192 grams of product. The filtered product was the non-agglomerated monocrystal cathode material made of Ni, Co and Mn and doped with multiple other elements for lithium ion batteries.

This cathode material comprises of non-agglomerated monocrystals in layered structure, having particle diameter between 0.5 and 15 μm and compacted density of 3.4 g/cm$^3$. This multi-element cathode material was then used to make a battery. The cathode coating formula consists of 3.5% of PVDF, 93.6% of the cathode material and 2.9% of conductive carbon black; the anode coating consists of 6.5% of PVDF and 93.5% of electrographite. The area of the cathode and anode is 7 cm$^2$ each. The battery was tested using PCBT-138-4D battery measurement instrument made by Wuhan LiXing Measurement Equipment Co., Ltd. and the initial discharge capacity was shown to be 149.1 mAh/g and the discharge capacity decreased by 2.5% after 100 cycles. A battery using current compound crystal cathode material instead of the multi-element cathode material of this invention having the same composition as the battery above was shown to have initial discharge capacity of 142 mAh/g when tested under the same condition.

Example 2

Nickel nitrate (Ni(NO$_3$)$_2$) containing 40.8 grams of Ni, cobaltous nitrate (Co(NO$_3$)$_2$ containing 40.9 grams of Co and manganous nitrate (Mn(NO$_3$)$_2$) containing 38.2 grams of Mn were dissolved in 1.7 L water, making 2.09 L of solution. Neodymium nitrate (Nd(NO$_3$)$_3$) that contains 0.02 gram of Nd, Eu(NO$_3$)$_3$ that contains 0.06 gram of Eu, Dy((NO$_3$)$_3$ that contains 0.12 gram of Dy and potassium tantalate KTaO$_3$ that contains 0.1 gram of Ta were added to the solution, stirred and dissolved to make 2.1 liters of multi-element salt solution with a total molar concentration of the metals being 1.0 mol/L. In this solution, the molar ratio of Ni, Co and Mn is Ni:Co:Mn=1:1:1 and the total amount of Nd, Dy, Eu and Ta is 0.25% of the total weight of Ni, Co and Mn.

The multi-element salt solution prepared above was heated to about 60° C. then 1 L of the solution was added, at a rate of 6-9 mL/min, to 2 L basic solution, in which the concentrations of NH$_3$ and NaOH are 0.73 mol/L and 0.73 mol/L, respectively, that contains 1.1 grams of Macrogol 6000 and was heated to 45° C., in which the amount of Macrogol 6000 is 0.92% the weight of the total weight of the elements Ni, Co and Mn. The solution was then stirred to facilitate the reactions for 2.5 hours, then 58.6 grams of NaOH was added to the solution, then the rest of the salt solution was added while stirred. The stirring continued for 2 hours after the addition, then the solution was sit for 2 hours and filtered to obtain solid products. The solids were washed with 1.8 L de-ionized water, then calcined at 105-115° C. for 4 hours to obtain 191.5 grams of intermediate.

The intermediate was then mixed with 92.1 grams of LiOH.H$_2$O and the mixture was grounded thoroughly, then pretreated at 500° C. for 2 hours. The pretreated intermediate was then evenly mixed with 1.8 grams of PVA, which is 1.5% of the total weight of Ni, Co and Mn, and compacted to lumps. The lumps were placed in an oven and calcined at 800° C. for 15 hours, then at 900° C. for 7 hours. The lumps were then cooled to about 45° C., crashed and filtered through a 400 mesh sieve. The filtered product was then placed in a porcelain dish and calcined at 700° C. for 7 hours, cooled to about 45° C., crashed and filtered to obtain 195.1 grams of product, which is the multi-element cathode material of this invention that comprises of non-agglomerated monocrystals and is made of Ni, Co and Mn that is doped with multiple other elements for lithium ion batteries.

This cathode material comprises of non-agglomerated monocrystals in layered structure, having particle diameter between 0.7 and 12 μm and compacted density of 3.45 g/cm$^3$. It shows initial discharge capacity of 150.3 mAh/g and the discharge capacity decreased by 2.5% after 100 cycles.

Example 3

207.5 grams of nickel sulfate NiSO$_4$ with weight percentage of Ni being 21.2%, 179.0 grams of cobalt sulfate CoSO$_4$ with weight percentage of Co being 20.56% and 127.6 grams of manganese sulfate MnSO$_4$ with weight percentage of Mn being 32.2% were mixed in 1.3 L water and dissolved by stirring and then filtered. Lanthanum nitrate La(NO$_3$)$_3$ that contains 0.11 gram of La, Dy((NO$_3$)$_3$ that contains 0.08 gram of Dy, sodium molybdate Na$_2$MoO$_4$ that contains 0.07 gram of Mo and KTaO$_3$ that contains 0.08 gram of Ta were added to the filtrate and stirred to dissolve to make 1.7 L of multi-element salt solution with the total molar concentration of the metals being 1.25 mol/L. In this solution, the molar ratio of Ni, Co and Mn is Ni:Co:Mn=1.2:1:1.2 and the total amount of La, Dy, Mo and Ta is 0.28% of the total weight of Ni, Co and Mn.

The multi-element salt solution prepared above was heated to about 40° C. then added, at a rate of 25-30 mL/min, to 2 L sodium oxalate solution with a molar concentration of sodium oxalate being 1.1 mol/L that is about 50° C. and contains 0.5 gram of Macrogol 6000, which is 0.41% of the total weight of the elements Ni, Co and Mn. The amount of sodium oxalate used is 105% of theoretical amount. After addition of the multi-element salt solution into the sodium oxalate solution, the mixture was stirred for 1 hour, sit for 1 hour and then filtered to obtain solid products. The solids were washed with 1.5 liter of de-ionized water and calcined at 120° C. for 3 hours to obtain 310.6 grams of Ni, Co and Mn multi-element intermediate.

The intermediate was mixed with 93.9 grams of LiOH.H$_2$O and grounded, then pretreated at about 520° C. for 2 hours. The mixture was then mixed evenly with 1.2 grams of PVA, which is 0.98% of the total weight of Ni, Co and Mn, and compacted into lumps. The lumps were placed in an oven and calcined at 800° C. for 10 hours, then at 900° C. for 6 hours and then crashed and filtered through a 400 mesh sieve. The filtered product was then placed in a porcelain dish and calcined at 700° C. for 8 hours in an oven, then cooled to about 55° C., crashed and filtered through a 400 mesh sieve to obtain 199.5 grams of product, which was the non-agglomerated monocrystal cathode material made of Ni, Co and Mn and doped with multiple other elements for lithium ion batteries. The recovery of Ni, Co and Mn in this example is 97.5%.

This cathode material comprises of non-agglomerated monocrystals in layered structure, having particle diameter between 0.8 and 16 μm and compacted density of 3.4 g/cm$^3$. The initial discharge capacity was 149.9 mAh/g at 4.2 V and 176 mAh/g at 4.5 V, respectively. The discharge capacity decreased 2.1% after 100 cycles of charge and discharge.

We claim:
1. A method for preparing a multi-element cathode material comprising the following steps:
   a) preparing a Ni, Co and Mn multi-element intermediate wherein step (a) comprises the steps of:
   dissolving one or more sulfate or nitrate of Ni, Co and Mn in water to form a first solution;
   adding a salt of Mo, Cr, Ge, In, Sr, Ta, Mg or a salt of one or more of rare earth elements to the first solution to make a second solution, wherein the second solution has a molar concentration of all metal elements in the range of 0.8-1.3 mol/L, in which a molar ratio of Ni, Co and Mn is Ni:Co:Mn=(0.9-1.2):1:(0.9-1.2), and a total amount of Mo, Cr, Ge, In, Sr, Ta, Mg and/or rare earth elements is 0.13-0.3% of the total weight of Ni, Co and Mn;
   adding the second solution into a basic solution of NaOH and NH$_3$ that contains polyethylene glycol or an oxalate solution that contains polyethylene glycol at a rate of 5-30 mL/min in a temperature range of 40-70° C. to obtain a third solution;
   stirring the third solution for 1-2 hours before settling for 1-4 hours and filtering to obtain a solid;
   washing the solid with de-ionized water until a weight percentage of element Na is less than 0.01%;
   drying the solid at 105-120° C. for 3-5 hours to obtain the Ni, Co and Mn multi-element intermediate;
   b) mixing the Ni, Co and Mn multi-element intermediate with a Lithium salt to obtain a first mixture, wherein the molar ratio of the mixture is Li:(Ni+Co+Mn)=1.05-1.1:1, grounding the first mixture for 2-8 hours before preheating at 500-520° C. for 2 hours; mixing polyvinyl alcohol (PVA) with the pretreated material to form lumps, where an amount of PVA used is 0.98-2% of the total weight of Ni, Co and Mn;
   c) calcining the lumps obtained above at 800-930° C. for 16-22 hours before cooling to 45-55° C., and crashing the calcining lumps and sieving through a 400 mesh sieve to obtain a filtrate;
   d) placing the filtrate in a porcelain dish and calcining at 700-800° C. for 5-8 hours before cooling to 45-55° C., and crashing the calcined filtrate through a 400 mesh sieve to obtain the multi-element cathode material.

2. The preparation method of claim 1, wherein the amount of polyethylene glycol used is about 0.4-1.5% of the total weight of Ni, Co and Mn.

3. The preparation method of claim 1, wherein the concentration of NaOH and NH$_3$ in the basic NaOH and NH3 solution is 0.02-0.9 mol/L and 0.01-0.9 mol/L, respectively.

4. The preparation method of claim 1, wherein the amount of the basic NaOH and NH$_3$ solution is 1.04-1.07 times of an stoichiometric amount.

5. The preparation method of claim 1, wherein the oxalate solution contains 0.8-1.2 mol/L ammonium oxalate or sodium oxalate solution.

6. The preparation method of claim 1, wherein the amount of the oxalate solution used is 1.05-1.1 times of an stoichiometric amount.

7. The preparation method of claim 3, wherein the amount of the basic NaOH and NH$_3$ solution is 1.04-1.07 times of an stoichiometric amount.

8. The preparation method of claim 5, wherein the amount of the oxalate solution used is 1.05-1.1 times of an stoichiometric amount.

* * * * *